US011052906B2

(12) United States Patent
Schueth et al.

(10) Patent No.: US 11,052,906 B2
(45) Date of Patent: Jul. 6, 2021

(54) DYNAMIC ROLL OVER CONTROL SYSTEM FOR MACHINES

(71) Applicant: Caterpillar Inc., Deerfield, IL (US)

(72) Inventors: Stephen P. Schueth, Peoria, IL (US); Joel L. Skalet, Chillicothe, IL (US); Rodney L. Menold, Hanna City, IL (US); Anthony J. Weltzer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 164 days.

(21) Appl. No.: 16/395,983

(22) Filed: Apr. 26, 2019

(65) Prior Publication Data

US 2020/0339106 A1    Oct. 29, 2020

(51) Int. Cl.
| | |
|---|---|
| *B60W 30/04* | (2006.01) |
| *B60W 40/13* | (2012.01) |
| *B60W 40/11* | (2012.01) |
| *B60W 40/112* | (2012.01) |
| *B60W 40/114* | (2012.01) |
| *B60W 40/105* | (2012.01) |

(52) U.S. Cl.
CPC .......... *B60W 30/04* (2013.01); *B60W 40/105* (2013.01); *B60W 40/11* (2013.01); *B60W 40/112* (2013.01); *B60W 40/114* (2013.01); *B60W 40/13* (2013.01); *B60W 2040/133* (2013.01); *B60W 2040/1338* (2013.01); *B60W 2040/1346* (2013.01); *B60W 2300/12* (2013.01); *B60W 2520/28* (2013.01)

(58) Field of Classification Search
CPC .... B60W 30/04; B60W 40/105; B60W 40/11; B60W 40/112; B60W 40/114; B60W 40/13; B60W 2040/133; B60W 2040/1338; B60W 2040/1346; B60W 2300/12; B60W 2520/28
See application file for complete search history.

(56) References Cited

U.S. PATENT DOCUMENTS

| | | | |
|---|---|---|---|
| 6,405,844 B1* | 6/2002 | Takamatsu | B60K 28/165 192/103 F |
| 7,477,972 B2 | 1/2009 | Stavroff et al. | |
| 7,963,547 B2 | 6/2011 | Anderson | |
| 9,114,705 B2 | 8/2015 | Goraya et al. | |
| 2005/0028842 A1 | 2/2005 | Brewer et al. | |
| 2005/0216164 A1 | 9/2005 | Sakata | |

(Continued)

FOREIGN PATENT DOCUMENTS

| | | |
|---|---|---|
| CN | 101706373 A | 5/2010 |
| CN | 104554439 A | 4/2015 |
| WO | WO 2016/085369 A1 | 6/2016 |

*Primary Examiner* — Tyler J Lee
*Assistant Examiner* — Yufeng Zhang
(74) *Attorney, Agent, or Firm* — Leydig, Voit & Mayer, Ltd.

(57) ABSTRACT

A dynamic roll over control system generates ground speed signals indicative of a current speed and compares the current speed to a desired speed. The desired speed is determined based upon the machine characteristics, the payload of the bed, the yaw rate of the bed, the pitch rate of the bed, and the roll angle of the bed. When the current speed of the machine exceeds the desired speed, the controller generates prime mover control signals to control operation of the prime mover to slow the machine so the current speed does not exceed the desired speed.

19 Claims, 6 Drawing Sheets

(56) References Cited

U.S. PATENT DOCUMENTS

| | | |
|---|---|---|
| 2007/0078581 A1 | 5/2007 | Nenninger et al. |
| 2011/0022267 A1 | 1/2011 | Murphy |
| 2015/0315982 A1 | 11/2015 | Koenen et al. |
| 2016/0023654 A1* | 1/2016 | Yamashita ...... B60W 30/18145 701/69 |
| 2017/0008525 A1* | 1/2017 | Ko .................. B60W 30/18127 |
| 2017/0074705 A1* | 3/2017 | Keates ................. G07C 5/0808 |
| 2017/0225639 A1 | 8/2017 | Chaco et al. |
| 2018/0079415 A1* | 3/2018 | Moriya ........... B60W 30/18145 |
| 2018/0162410 A1 | 6/2018 | Skillsäter et al. |
| 2020/0247371 A1* | 8/2020 | VanAntwerp ............. B60T 7/12 |
| 2020/0307613 A1* | 10/2020 | Richards ........... B60W 50/0205 |

* cited by examiner

DYNAMIC ROLL OVER CONTROL SYSTEM FOR MACHINES

TECHNICAL FIELD

This disclosure relates generally to a roll over control system and, more particularly, to a dynamic roll over control system using drivetrain dynamics to reduce the likelihood of machine roll overs.

BACKGROUND

Machines such as haul trucks, articulated trucks, and other types of machines are often used to move a payload as part of an operation associated with an industry such as mining, construction, farming, transportation, or any other industry. It may take a significant amount of training before an operator may be characterized as an expert or even an intermediate operator.

When hauling a payload, the machine operators may be attempting to operate the machines as fast as possible in order to reduce the time between loading and dumping locations. However, some machines, and in particular articulated trucks, may be relatively unstable when operated at high speeds with a significant load in the dump body. In particular, when operating the machines around curves at too great a speed, the centripetal force may cause the trailer or dump body portion of the machine to tip or roll over. Further, in some instances, such as with an articulated truck, the cab and dump body may undergo significant independent movement (e.g., oscillation and/or roll) relative to each other. Accordingly, while a machine operator may feel the centripetal force on the cab, they may not feel the forces or motion of the dump body. While such a roll over event may not cause significant damage to the machine, the time spent uprighting the dump body and cleaning up the spilled material may significantly reduce the efficiency of the material moving operation.

U.S. Patent Publication No. 2017/0225639 discloses a roll over detection system that operates to perform a dynamic stability analysis based upon an analysis of 3-axis acceleration and/or 3-axis angular rates. The system can include warning system including an alarm as well as a light bar. The system may further include memory to store data and information of the static and dynamic properties of the vehicle.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a dynamic roll over control system for a machine includes a prime mover, a ground engaging drive mechanism, a bed, a payload sensor, a yaw rate sensor, a pitch rate sensor, a roll angle sensor, a ground speed sensor, and a controller. The ground engaging drive mechanism is operatively connected to the prime mover. The bed is configured to carry a payload. The payload sensor is configured to generate payload signals indicative of the payload of the bed. The yaw rate sensor is configured to generate yaw rate signals indicative of a yaw rate of the bed. The pitch rate sensor is configured to generate pitch rate signals indicative of a pitch rate of the bed. The roll angle sensor is configured to generate roll angle signals indicative of a roll angle of the bed. The ground speed sensor is configured to generate ground speed signals indicative of a current speed of the machine. The controller is configured to access machine characteristics of the machine, determine the payload of the bed based upon the payload signals, determine the yaw rate of the bed based upon the yaw rate signals, determine the pitch rate of the bed based upon the pitch rate signals, determine the roll angle of the bed based upon the roll angle signals, and determine a desired speed of the bed based upon the machine characteristics, the payload of the bed, the yaw rate of the bed, the pitch rate of the bed, and the roll angle of the bed. The controller is further configured to determine a current speed of the machine based upon the ground speed signals and, when the current speed of the machine exceeds the desired speed, generate prime mover control signals to control operation of the prime mover to slow the machine so the current speed does not exceed the desired speed.

In another aspect, a method of controlling stability of a bed of a machine includes accessing machine characteristics of the machine, determining a payload of the bed based upon payload signals from a payload sensor, determining a yaw rate of the bed based upon yaw rate signals from a yaw rate sensor, determining a pitch rate of the bed based upon pitch rate signals from a pitch rate sensor, determining a roll angle of the bed based upon roll angle signals from a roll angle sensor, and determining a desired speed of the bed based upon the machine characteristics, the payload of the bed, the yaw rate of the bed, the pitch rate of the bed, and the roll angle of the bed. The method further includes determining a current speed of the machine based upon ground speed signals from a ground speed sensor and, when the current speed of the machine exceeds the desired speed, generating prime mover control signals to control operation of a prime mover of the machine to slow the machine so the current speed does not exceed the desired speed.

In still another aspect, a machine includes a front frame portion, a rear frame portion, a prime mover, a bed, a payload sensor, a yaw rate sensor, a pitch rate sensor, a roll angle sensor, a ground speed sensor, and a controller. The front frame portion includes a front ground engaging drive mechanism. The rear frame portion includes a rear ground engaging drive mechanism with the rear frame portion operatively connected to the front frame portion. The prime mover is operatively connected to at least one of the front ground engaging drive mechanism and the rear ground engaging drive mechanism. The bed is operatively connected to the rear frame portion and configured to carry a payload. The payload sensor is configured to generate payload signals indicative of the payload of the bed. The yaw rate sensor is configured to generate yaw rate signals indicative of a yaw rate of the bed. The pitch rate sensor is configured to generate pitch rate signals indicative of a pitch rate of the bed. The roll angle sensor is configured to generate roll angle signals indicative of a roll angle of the bed. The ground speed sensor is configured to generate ground speed signals indicative of a current speed of the machine. The controller is configured to access machine characteristics of the machine, determine the payload of the bed based upon the payload signals, determine the yaw rate of the bed based upon the yaw rate signals, determine the pitch rate of the bed based upon the pitch rate signals, determine the roll angle of the bed based upon the roll angle signals, and determine a desired speed of the bed based upon the machine characteristics, the payload of the bed, the yaw rate of the bed, the pitch rate of the bed, and the roll angle of the bed. The controller is further configured to determine a current speed of the machine based upon the ground speed signals and, when the current speed of the machine exceeds the desired speed, generate prime mover control signals to control operation of the prime mover to slow the machine so the current speed does not exceed the desired speed.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1:
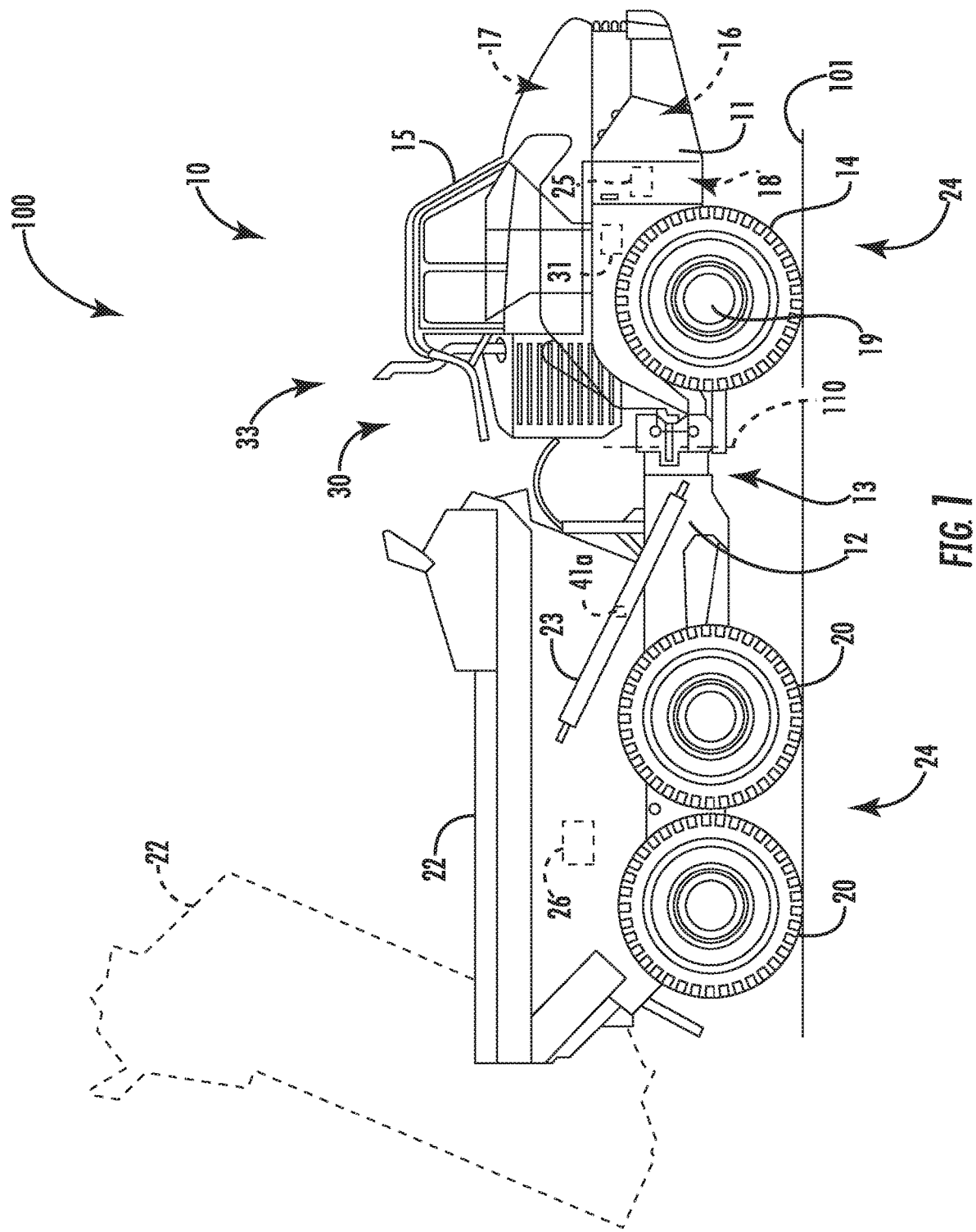
FIG. 1 depicts a schematic illustration of a machine in which the principles disclosed herein may be used.

FIG. 1 illustrates a portion of an exemplary work site 100 at which a plurality of mobile machines may operate to perform material moving operations. The work site 100 may include, for example, a mine site, a landfill, a quarry, a construction site, a road work site, or any other type of work site. The machines may perform any of a plurality of desired operations at work site 100, and such operations may require the machine to generally traverse the work site 100. As depicted, the work site 100 includes a haul truck such as articulated truck 10 used to transport material from a loading location (not shown) to a dump location (not shown) before returning to be filled again.

The articulated truck 10 includes a front frame portion 11 and a rear frame portion 12 coupled at an articulation joint 13 defining an articulation axis 110. The front frame portion 11 may be supported by a of ground engaging drive mechanism, such as front wheels 14 and may support an operator station or cab 15 and a drive system generally depicted at 16. The drive system 16 may include a prime mover such as an internal combustion engine, generally depicted at 17, operatively connected to transmit power to a transmission, generally depicted at 18, including a plurality of gears. The transmission 18 in turn may be configured to transmit power to the ground engaging drive mechanism (e.g., front wheels 14) by way of axle 19 using any known means.

The rear frame portion 12 may be supported by a ground engaging drive mechanism, such as rear wheels 20 and supports a bed or dump body 22. The dump body 22 may be selectively pivoted between a load position (illustrated) and a dump or unload position (such as that shown in phantom) by one or more hoist cylinders 23 in response to a hoist command such as one generated by an operator located in the cab 15.

Figure 6:
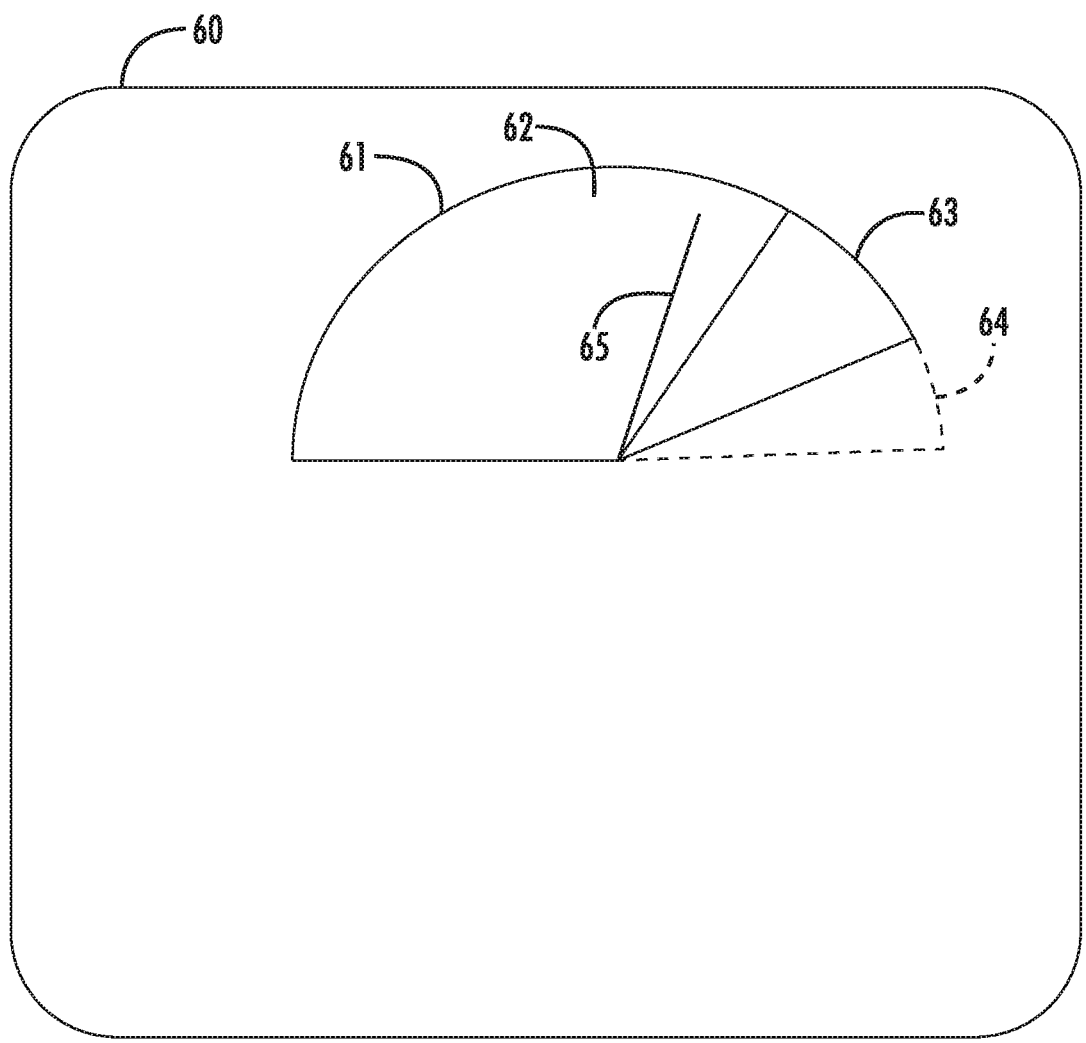
FIG. 6 depicts a display within the cab of the machine of FIG. 1.

Service brakes, as indicated generally at 24, may be associated with each of the front wheels 14 and the rear wheels 20. A display 60 (FIG. 6) may be provided within the cab 15 as described below in further detail.

The articulated truck 10 may include a control system 30, as shown generally by an arrow in FIG. 1 indicating association with the machine. The control system 30 may utilize one or more sensors that provide data and input signals representative of various operating parameters of the articulated truck 10 and the environment of the work site 100 at which the machine is operating. The control system 30 may include an electronic control module or controller 31 and a plurality of sensors associated with the articulated truck 10.

The controller 31 may be an electronic controller that operates in a logical fashion to perform operations, execute control algorithms, store and retrieve data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 31 such as power supply circuitry, signal conditioning circuitry, driver circuitry, and other types of circuitry.

The controller 31 may be a single controller or may include more than one controller disposed to control various functions and/or features of the articulated truck 10. The term "controller" is meant to be used in its broadest sense to include one or more controllers and/or microprocessors that may be associated with the articulated truck 10 and that may cooperate in controlling various functions and operations of the machine. The functionality of the controller 31 may be implemented in hardware and/or software without regard to the functionality. The controller 31 may rely on one or more data maps relating to the operating conditions and the operating environment of the articulated truck 10 and the work site 100 that may be stored in the memory of controller. Each of these data maps may include a collection of data in the form of tables, graphs, and/or equations.

The control system 30 and controller 31 may be located on the articulated truck 10 or may be distributed with components also located remotely from the machine such as at a command center (not shown). The functionality of control system 30 may be distributed so that certain functions are performed at articulated truck 10 and other functions are performed remotely. In such case, the control system 30 may include a communications system such as wireless network system (not shown) for transmitting signals between the articulated truck 10 and a system located remote from the machine such as at the command center.

The articulated truck 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the articulated truck 10 and that may cooperate to sense various functions, operations, and operating characteristics of the machine and/or aspects of the environment in which the machine is operating.

Figure 2:
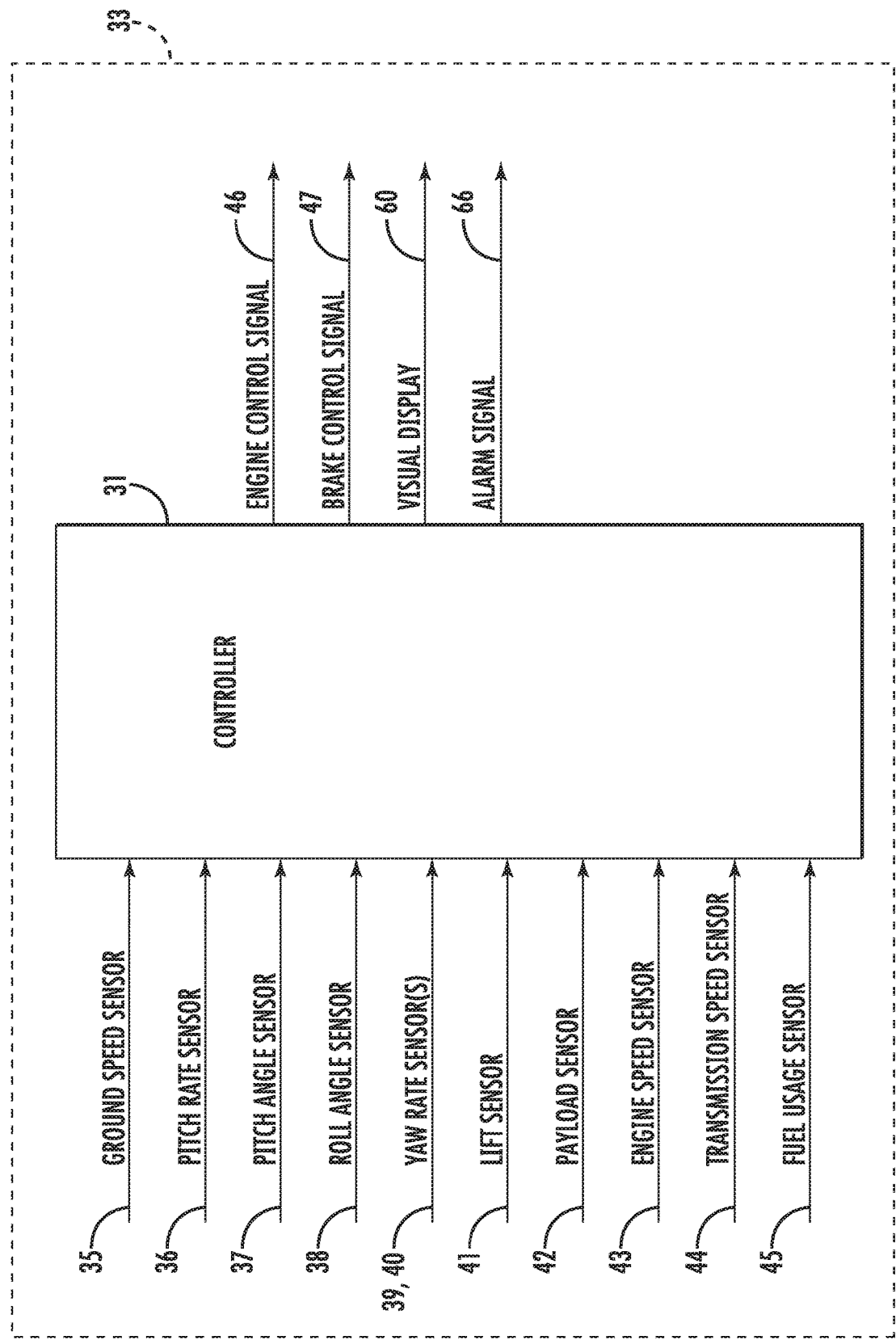
FIG. 2 depicts a block diagram of the dynamic roll over control system used with the machine of FIG. 1.

Referring to FIG. 2, a ground speed sensor 35 may be provided and is operative to generate ground speed signals or data indicative of the speed at which the articulated truck 10 is operating. In one embodiment, the ground speed sensor 35 may be configured as a wheel rotation speed sensor that measures the rotation rate of one or more of the front wheels 14 or the rear wheels 20. The controller 31 may use the known dimensions of the front wheels 14 or the rear wheels 20 together with the wheel rotation rate to determine the ground speed of the articulated truck 10. In another embodiment, the ground speed sensor 35 may use the data from a position sensor to determine the ground speed of the articulated truck 10. In such an embodiment, the position sensor may include one or more sensors that interact with a positioning system such as a global navigation satellite system or a global positioning system. Other manners of determining the ground speed of the articulated truck 10 are contemplated as would be understood by one skilled in the art.

A pitch rate sensor 36 may be provided and is operative to generate pitch rate signals or data indicative of the pitch rate of the dump body 22. The pitch rate sensor 36 may be operative to determine the pitch rate or the rate of change of the angle between the front of the dump body 22 and the rear of the dump body. If desired, a pitch rate sensor may also be provided for the front frame portion 11. In an embodiment, a multi-axis inertial measurement unit ("IMU") such as a six-axis IMU depicted at 25 on the front frame portion 11 and at 26 on the dump body 22 in FIG. 1 may operate as pitch rate sensors.

A pitch angle sensor 37 may be provided and is operative to generate pitch angle signals or data indicative of the pitch angle of the dump body 22. The pitch angle sensor 37 may be operative to determine the pitch angle or the angle between the front of the dump body 22 and the rear of the dump body. If desired, a pitch angle sensor may also be provided for the front frame portion 11. In an embodiment, the IMUs 25, 26 on the front frame portion 11 and the dump body 22, respectively, may operate as pitch angle sensors.

A roll angle sensor 38 may be provided and is operative to generate roll angle signals or data indicative of the role angle of the dump body 22. The roll angle sensor 38 may be operative to determine the role angle or the angle between the right side and left side of the dump body 22 along the longitudinal axis of the dump body. If desired, a roll angle sensor may also be provided for the front frame portion 11. In an embodiment, the IMUs 25, 26 on the front frame portion 11 and the dump body 22, respectively, may operate as roll angle sensors.

A yaw rate sensor 39 may be provided and is operative to generate yaw rate signals or data indicative of the yaw rate of the dump body 22. The yaw rate sensor 39 may be operative to determine the yaw rate or the rate at which the dump body 22 is rotating about a vertical axis (i.e., turning right or left). If desired, a yaw rate sensor may also be provided for the front frame portion 11 as is depicted by the second yaw rate sensor 40. In an embodiment, the IMUs 25, 26 on the front frame portion 11 and the dump body 22, respectively, may operate as the yaw rate sensors.

A dump body lift sensor 41 may be provided and is operative to generate lift angle signals or data indicative of the angle of the dump body 22 relative to the rear frame portion 12 of the articulated truck 10. In an embodiment, the IMU 26 on the dump body 22 may operate as the dump body lift sensor 41. In another embodiment, the dump body lift sensor 41 may be configured as a sensor 41a (FIG. 1) provided on one or more of the hoist cylinders 23.

A payload sensor 42 may be provided and is operative to generate payload signals or data indicative of the weight of the payload within the dump body 22. In an embodiment, the IMU 26 on the dump body 22 may operate as the payload sensor 42. The controller 31 may be operative to monitor signals from the IMU 26 and determine that the dump body has been loaded after a predetermined number of readings from the IMU consistent with a loading operation. For example, during a loading operation, the IMU 26 may indicate two or three significant vertical movements (e.g., acceleration) of the dump body 22 without intervening horizontal movement of the IMU, followed by horizontal movement of the dump body. The controller 31 may begin with an assumed payload value and adjust the payload value based upon operating conditions as the articulated truck 10 moves about the worksite. For example, based upon a given engine speed, fuel consumption rate, the assumed payload value, and a known slope upon which the articulated truck 10 is moving, the controller 31 may determine an expected speed or acceleration. The controller 31 may determine the actual payload value based upon the extent that the actual speed or acceleration deviates from the expected speed or acceleration.

Other configurations for the payload sensor 42 are contemplated. For example, the pressure within the hoist cylinders 23 may be measured and the pressure used to determine the payload. Still further, strain gauges may be mounted on the dump body 22.

A prime mover or engine speed sensor 43 may be provided and is operative to generate engine speed signals or data indicative of the rotational speed of the engine 17. A transmission speed sensor 44 may be provided and is operative to generate transmission speed signals or data indicative of the rotational speed of the transmission 18. A fuel usage sensor 45 may be provided and is operative to generate fuel usage signals or data indicative of the amount of fuel being provided to the engine 17. The engine speed sensor 43 and the fuel usage sensor 45 in conjunction with the transmission speed sensor 44 and/or characteristics of the transmission 18 may operate as a torque sensor to determine the amount of torque or power being provided by the engine 17.

During operation, once the centripetal moment resulting from the centripetal force on the dump body 22 exceeds the gravitational moment resulting from the net gravitational force on the dump body, the dump body 22 may begin to tip over. Accordingly, the control system 30 may include a dynamic roll over control system 33 to reduce the likelihood that the dump body 22 will tip over. The dynamic roll over control system 33 operates to maintain the centripetal moment on the dump body 22 below or less than the gravitational moment on the dump body. To do so, the dynamic roll over control system 33 operates by maintaining the speed of the dump body 22 below the speed at which the centripetal moment will exceed the gravitational moment. Such a maximum speed is sometimes referred to herein as the critical speed.

In operation, the dynamic roll over control system 33 may incorporate a factor of safety relative to the critical speed. The critical speed as modified by a factor of safety may be referred to as a desired speed of the dump body 22 or the desired speed of the machine. In an example, the factor of safety may be between 1.1 and 3.0. In another example, the factor of safety may be between 1.3 and 2.2. In a further example, the factor of safety may be about 1.6.

The dynamic roll over control system 33 may operate by initially attempting to control the speed or operation of the articulated truck 10 by controlling the operation of the engine 20 and then further rely upon the service brakes 24 if necessary. As an example, if the machine is operating slightly faster (e.g., 5%) than the desired speed, the dynamic roll over control system 33 may not require a significant change in the operation of the engine 17 to reduce the actual speed of the machine below the desired speed. However, if the machine is operating significantly faster (e.g., 15%) than the desired speed, the dynamic roll over control system 33 may substantially reduce the fuel to the engine 17 to reduce the actual speed of the machine below the desired speed. In an example in which the machine is operating at a rate much greater (e.g., 25%) than the desired speed, the dynamic roll over control system 33 may not only require a significant reduction in the fuel supplied to the engine 17 but also require the application of the service brakes 24 to reduce the actual speed of the machine below the desired speed.

Figure 3:
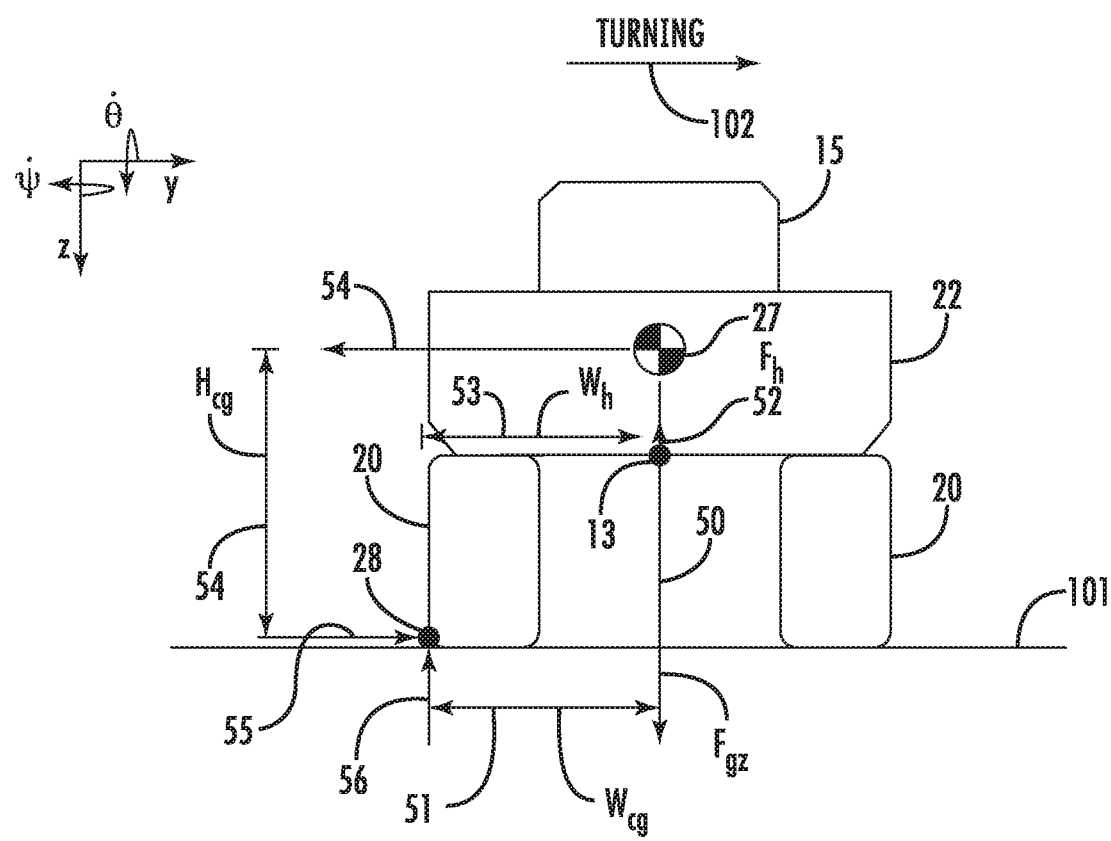
FIG. 3 depicts a schematic illustration of a free body diagram used to depict the forces on the machine of FIG. 1.

In an embodiment, the dynamic roll over control system 33 may determine the maximum or critical speed $v_{critical}$ based upon the free body diagram depicted in FIG. 3 with the dump body 22 positioned on a horizontal surface 101 and the dump body turning as depicted by the arrow 102. The critical speed $v_{critical}$ may be expressed as:

$$v_{critical} = \frac{F_{gz}w_{CG} - F_h w_h}{m\dot{\psi}h_{CG}} \qquad \text{Equation (1)}$$

where $F_{gz}$ is the force of gravity along the z-axis, $w_{CG}$ is the distance along the y-axis between the center of gravity 27 of the dump body 22 and the location 28 on the rear wheel 20 at which the wheel engages the horizontal surface 101, $F_h$ is the force at the articulation joint 13 tending to raise the front of the dump body 22 as a result of the imbalance of the front frame portion 11, $w_h$ is the distance along the y-axis between the articulation joint 13 and the location 28 on the rear wheel 20 at which the wheel engages the horizontal surface 101, m is the mass of the payload within the dump body, $\dot{\psi}$ is the yaw rate at which the dump body 22 is turning about the z-axis, and $h_{CG}$ is the distance along the z-axis between the center of gravity 27 of the dump body 22 and the location 28 on the rear wheel 20 at which the wheel engages the horizontal surface 101.

In FIG. 3, the force of gravity $F_{gz}$ along the z-axis is depicted at 50, the distance $w_{CG}$ along the y-axis between the center of gravity 27 of the dump body 22 and the location 28 on the rear wheel 20 at which the wheel engages the horizontal surface 101 is depicted at 51, the articulation joint force $F_h$ at the articulation joint 13 is depicted at 52, the distance $w_h$ along the y-axis between the articulation joint 13 and the location 28 on the rear wheel 20 at which the wheel engages the horizontal surface 101 is depicted at 53, the centripetal force caused by the turning of the dump body 22 about the z-axis is depicted at 54, the distance $h_{CG}$ along the z-axis between the center of gravity 27 of the dump body 22 and the location 28 on the rear wheel 20 at which the wheel engages the horizontal surface 101 is depicted at 55, the friction force resulting from the engagement of the rear wheel 20 with the horizontal surface 101 opposing the centripetal force 54 is depicted at 55, and the normal force at the engagement of the rear wheel 20 with the horizontal surface 101 opposing the net of the force of gravity 50 and the articulation joint force 52 is depicted at 56.

If, however, the articulated truck 10 is operating on a non-horizontal surface, the equation for determining the critical speed $v_{critical}$ should further take into consideration the slope of the surface upon which the articulated truck is operating. For example, referring to FIG. 4, in an embodiment, the dynamic roll over control system 33 may determine the maximum or critical speed $v_{critical}$ based upon the free body diagram with the dump body 22 positioned along a sloped surface 103 at an angle 104 in a first direction and the dump body turning away from the slope as depicted by arrow 105.

The critical speed $v_{critical}$ may be expressed as:

$$v_{critical} = \frac{F_{gz}w_{CG} + F_{gy}h_{CG} - F_h w_h}{m\dot{\psi}h_{CG} - m\dot{\theta}w_{CG}} \qquad \text{Equation (2)}$$

Equation (2) is similar to Equation (1) but also adds the terms: $F_{gy}$, which is the force of gravity along the y-axis, $\dot{\theta}$ is the pitch rate at which the dump body is turning about the y-axis. It should be noted that, as depicted in FIG. 3, the y- and z-axes are rotated with the sloped surface 103 so that the y-axis is parallel to the sloped surface and the z-axis is perpendicular to the sloped surface.

Figure 4:
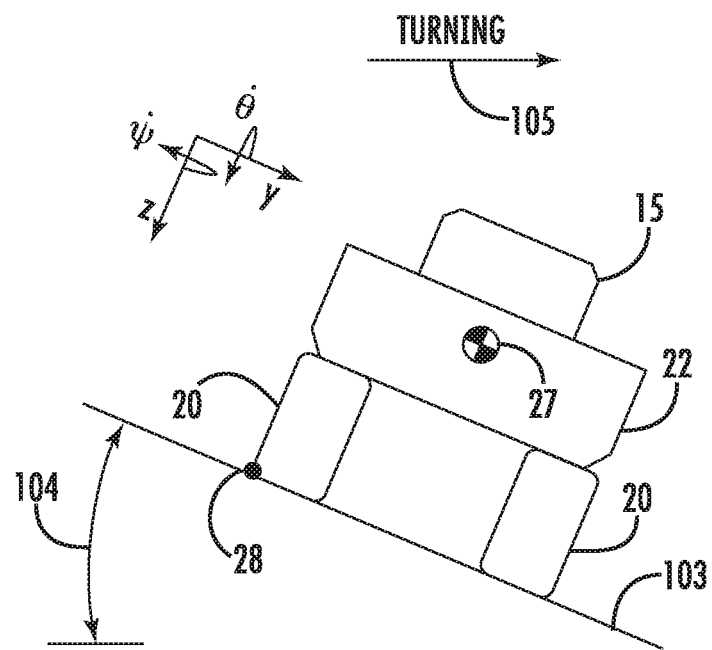
FIG. 4 depicts a view similar to FIG. 3 but with the machine turning on a sloped surface.
Figure 5:
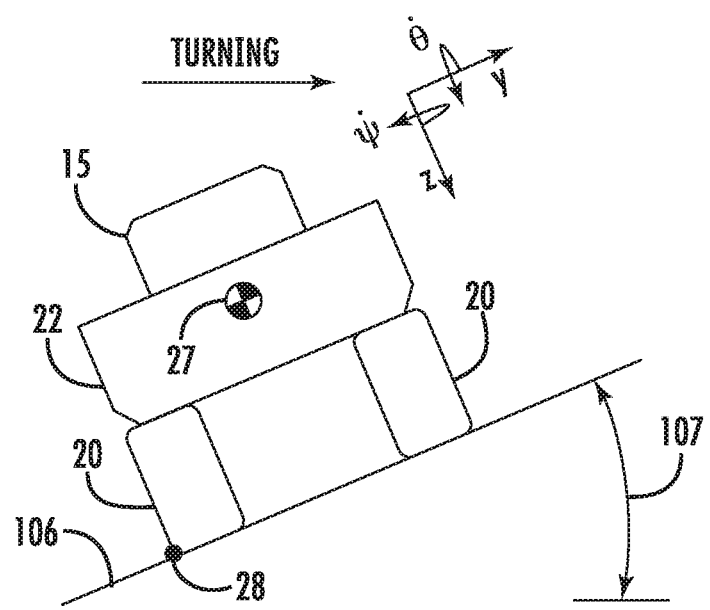
FIG. 5 depicts a view similar to FIG. 4 but with the surface sloped in an opposite direction.

Similarly, the dynamic roll over control system 33 may determine the critical speed $v_{critical}$ with the free body diagram of FIG. 4 and as follows with the dump body 22 positioned along a sloped surface 106 at an angle 107 in a second direction opposite that depicted in FIG. 3 and with the dump body turning into the slope as depicted at arrow 109:

$$v_{critical} = \frac{F_{gz}w_{CG} - F_{gy}h_{CG} - F_h w_h}{m\dot{\psi}h_{CG} + m\dot{\theta}w_{CG}} \qquad \text{Equation (3)}$$

It will be apparent to those skilled in the art that Equation (3) is identical to Equation (2) but with the sign of certain terms changed (i.e., from positive to negative or from negative to positive) to reflect the change in angle of the sloped surfaces 103, 106.

While Equations (1)-(3) may be used to determine the critical speed $v_{critical}$, as described above, the dynamic roll over control system 33 may actually use the critical speed together with a factor of safety without deviating from the concepts herein. The factor of safety may be added by modifying Equations (1)-(3) or by determining the critical speed $v_{critical}$ using Equations (1)-(3) and multiplying the critical speed by the factor of safety. Accordingly, as used herein, reference to the application of the desired speed may sometimes, but not always, include a margin of safety.

The dynamic roll over control system 33 may operate to by generating prime mover control signals 46 to control operation of the prime mover (e.g., the engine 17) to slow or reduce the speed of the articulated truck 10 so that it does not exceed the desired velocity. To do so, in an embodiment, the dynamic roll over control system 33 may operate by reducing the power output of the engine 17. For example, the dynamic roll over control system 33 may monitor the amount of fuel being supplied to the engine 17 and reduce the speed of the articulated truck 10 by controlling the amount of fuel provided to the engine.

The dynamic roll over control system 33 may also include a power loss feed forward function that operates to optimize or improve the manner in which the current speed of the dump body 22 is controlled to maintain the speed of the dump body below the desired speed. In doing so, the feed forward function of the dynamic roll over control system 33 may calculate or determine the amount of power loss that will occur or is occurring in view of one or more power loss factors. The dynamic roll over control system 33 may thus command or require an engine speed reduction that, when combined with the power loss factors, results in a reduction in the speed of the articulated truck below the desired speed.

The power loss factors may include an engine losses, transmission losses, output transfer gear and axle losses, rolling resistance losses, scrubbing losses, and losses or gains due to operating on a grade. The engine losses may include friction and other losses that are dependent upon the rotational speed of the engine 17, transmission 18 as determined by the engine speed sensor 43. The transmission losses may include friction and other losses that are dependent upon the rotational speed of the transmission 18 as determined by the transmission speed sensor 44. In an embodiment, the output transfer gear and axle losses may include friction and other losses that are dependent upon the speed of the articulated truck 10 as determined by the ground speed sensor 35.

The rolling resistance losses may be determined by a rolling resistance estimator of or operatively associated with the control system 30 configured to determine an estimate of the rolling resistance encountered by the articulated truck 10. In some instances, the rolling resistance losses may be significant since the articulated truck 10 may operate in a wide range of operating conditions, ranging from, for example, mud to pavement. The rolling resistance estimator may operate by determining the power output from the engine 1717, the load within the dump body 22, and the grade or slope on which the articulated truck is operating, and then comparing the actual ground speed to an expected ground speed. In some instances, the rolling resistance losses may also be based upon the speed of the articulated truck 10 as determined by the ground speed sensor 35. In an example, an actual ground speed greater than expected may indicate that the machine is operating on harder than expected material while an actual ground speed lower than expected may indicate that the machine is operating on a softer material than expected.

The scrubbing losses may be determined based upon the yaw rate as determined by the yaw rate sensor 39 and, in some instances, may also be based upon the type of material upon which the articulated truck 10 is traveling. A loss due to operating on a grade may be calculated based upon the pitch angle of the dump body 22. For example, when the articulated truck 10 is traveling uphill, the grade will result in a power loss, and the grade will result in a power gain (or a negative loss) when the articulated truck is traveling downhill.

In some instances, the articulated truck 10 may be traveling so fast that a reduction in engine speed together with the power losses associated with the feed forward function may be insufficient to slow the machine below the desired speed. In such case, the dynamic roll over control system 33 may also operate by generating braking commands or control signals 47 to apply the service brakes 24 to further slow the machine. There may be some instances in which it is desirable to apply the service brakes 24 even if a reduction in engine speed together with the feed forward function would be sufficient to slow the articulated truck below the desired speed.

The display 60 may include a stability indicator gauge 61 that indicates the current stability of the dump body 22 of the articulated truck 10. In an embodiment, the stability indicator gauge 61 may include a first zone 62 and a second zone 63. A third zone 64 is indicated in the drawings for purposes of clarity but may not be included in the stability indicator gauge 61. In the first zone 62, the articulated truck 10 is operating below the desired speed (i.e., the critical speed as calculated with the factor of safety). In the second zone 63, the articulated truck 10 is operating faster than the desired speed but does not exceed the critical speed (i.e., without the factor of safety). In the third zone 64, the articulated truck 10 exceeds the critical speed and thus is likely to tip over.

In an embodiment, the stability indicator gauge 61 may include an dial indicator 65 that moves to express the speed of the articulated truck 10 as a percentage of the desired speed. In another embodiment, the stability indicator gauge 61 may express the speed of the articulated truck 10 with a color coding system such as green, yellow, and red with the green in the first zone 62, red in the second zone 63, and yellow spanning the intersection of the first and second zones.

If desired, in addition to the stability indicator gauge 61, the dynamic roll over control system 33 may also generate an alarm signal 66 (FIG. 2) upon exceeding the desired speed. The alarm signal 66 may result in any or all of an on-board visible or audible alert for the operator, a message being transmitted off-board the articulated truck 10, or the incident being recorded within the controller 31.

INDUSTRIAL APPLICABILITY

The industrial applicability of the system described herein will be readily appreciated from the forgoing discussion. The foregoing discussion is applicable to machines such as the articulated truck 10 that are operated at a worksite to perform material movement operations. Such system may be used at a mining site, a landfill, a quarry, a construction site, a roadwork site, a forest, a farm, or any other area in which machine operation is desired.

The disclosed dynamic roll over control system 33 is operative to prevent or reduce the likelihood that a machine, or a portion of the machine such as the dump body 22, rolls or tips over as the machine traverses the work site 100. The dynamic roll over control system 33 may be used with machines regardless of whether the machines are being operated autonomously, semi-autonomously, or manually. Further, when operating manually, the dynamic roll over control system 33 may provide the machine operator with guidance to reduce the likelihood of a roll over and/or may further include automated controls to prevent or reduce the likelihood of such a roll over event.

Figure 7:
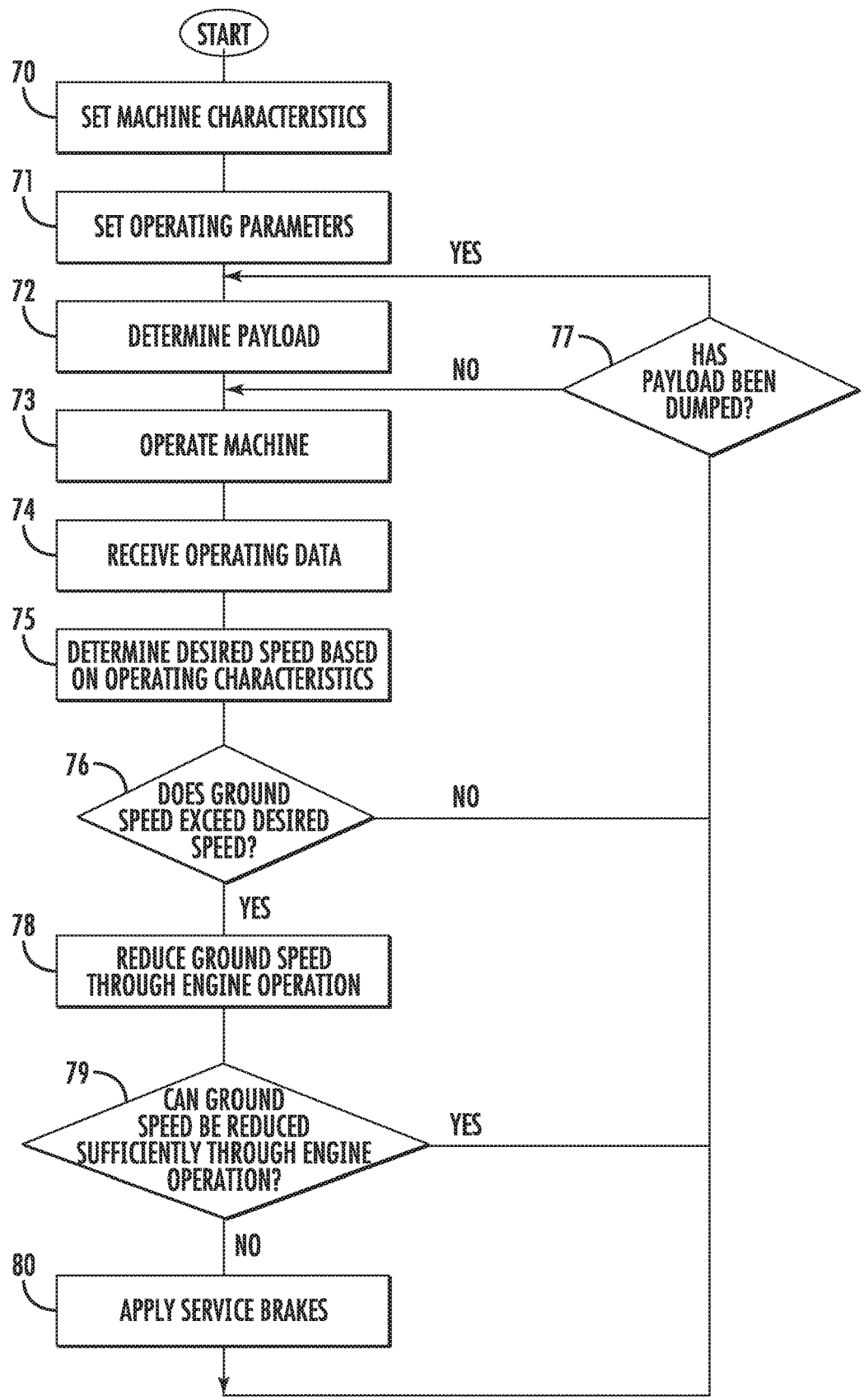
FIG. 7 depicts a flowchart of the operation of the dynamic roll over control system of FIG. 2.

FIG. 7 illustrates a flowchart of the operation of the dynamic roll over control system 33. At stage 70, the characteristics of the machine may be stored within or accessed by the controller 31. The machine characteristics may include, for example, the engine dynamics, the characteristics of the power loss feed forward factors, and the dimensions of the machine. The engine dynamics may include the power output based upon the engine speed and fuel consumption as well as engine friction losses used with the feed forward factors. The dimensions of the machine may include, for example, the location of the center of gravity 27, as well as the vertical and horizontal distances from the center of gravity to a position (e.g., 28) on one of the rear wheels 20 about which the critical velocity analysis is performed.

Operating parameters of the dynamic roll over control system 33 may be stored within or accessed by the controller 31 at stage 71. The operating parameters may include, for example, a factor of safety used when calculating or applying the desired speed together with the logic as to when and how to apply the service brakes 24.

At stage 72, the payload within the dump body 22 may be determined. In one embodiment, the payload may be determined by monitoring data from the payload sensor 42 as described above. In an embodiment in which the IMU 26 on the dump body 22 is monitored to determine the dump body payload, data from the dump body lift sensor 41 may be monitored to determine when the dump body has been emptied. For example, if the dump body 22 is positioned at a lift angle exceeding a threshold for a specified period of time, the controller 31 may be configured to determine that the dump body has been emptied.

The machine may be operated at stage 73. At stage 74, the controller 31 may determine the operating characteristics of the machine such as by receiving data or signals from the various sensors operatively associated with the machine. In particular, the controller 31 may receive ground speed data from the ground speed sensor 35, pitch rate data from the pitch rate sensor 36, pitch angle data from the pitch angle sensor 37, roll angle data from the roll angle sensor 38, yaw rate data from the yaw rate sensor 39 associated with the dump body 22, yaw rate data from the yaw rate sensor 40 associated with the front frame portion 11, engine speed data from the engine speed sensor 43, transmission speed data from the transmission speed sensor 44, and fuel usage data from the fuel usage sensor 45.

At stage 75, the controller 31 may determine the critical speed of the machine based upon the operating characteristics such as through the use of Equations (1)-(3), depending on the orientation of the slope upon which the machine is operating. A factor of safety may be added to the calculated critical speed to determine a desired speed used for subsequent analysis and control of the machine operation.

In some embodiments, the controller 31 may utilize the yaw rate of only the dump body 22. In other embodiments, the controller 31 may utilize an average of the yaw rate of the front frame portion 11 and the yaw rate of the dump body 22. This may be desirable since the current yaw rate of the front frame portion 11 may predict the future yaw rate of the dump body 22 since the front frame portion is positioned ahead of the dump body.

The controller 31 may determine at decision stage 76 whether the current speed of the machine exceeds the desired speed. If the current speed is less than the desired speed, the machine may continue to be operated. In doing so, the controller 31 may determine at decision stage 77 whether the load within the dump body 22 has been dumped based upon data from the dump body lift sensor 41 as described above. If the dump body has been emptied, the articulated truck 10 may continue to be operated and stages 72-76 repeated. If the dump body has not been emptied, the articulated truck 10 may continue to be operated and stages 73-76 repeated.

If the ground speed is greater than the desired speed, controller 31 may reduce the ground speed of the machine at stage 78 by controlling the operation of the engine 17. To do so, in one embodiment, the controller 31 may reduce the fuel supplied to the engine 17 to thus reduce the power generated by the engine. The amount of fuel reduction may be determined in view of one or more of the power loss feed forward factors such as the engine friction losses, transmission losses, output transfer gear and axle losses, rolling resistance losses, scrubbing losses, and losses or gains due to operating on a grade. By analyzing the operating characteristics of the machine and the power loss feed forward factors, the controller 31 may accurately determine the extent to which the fuel usage should be reduced to maintain the current speed below the desired speed.

In some instances, even significantly reducing fuel to the engine 17 and relying on the power loss feed forward factors may not be sufficient to adequately slow the machine to prevent tipping. Accordingly, at decision stage 79 the controller 31 may determine whether the machine speed can be sufficiently reduced by only controlling the operation of the engine 17. If the machine speed can be sufficiently controlled, the machine may continue to be operated and stages 72- or 73-79 repeated. If the machine speed cannot be sufficiently controlled by controlling the operation of the engine 17, the controller 31 may generate at stage 80 a braking command 47 to apply the service brakes 24 to further slow the machine. Operation of the machine may then be continued and stages 72- or 73-80 repeated.

Various alternatives are contemplated. For example, the controller 31 may monitor data from the dump body lift sensor 41 to determine when the elevation or lift angle of the dump body 22 is changing such as when the dump body is being lowered after being dumped. While the angle of the dump body 22 is changing, the controller 31 may be configured to ignore signals from the pitch rate sensor 36 and the yaw rate sensor 39 and of the dump body 22 and rely only on the pitch rate and yaw rate of the front frame portion 11 since the yaw rate data from the dump body may not be accurate while the lift angle of the dump body is changing. More specifically, the movement of the dump body 22 from a raised or dump position to the lowered position may include movement that may be incorrectly read or interpreted by the IMU 26 as part of the pitch rate and yaw rate of the dump body. This may occur as an operator completes a dumping operation and drives away to receive the next load.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A dynamic roll over control system for a machine, comprising:
   a prime mover;
   a ground engaging drive mechanism operatively connected to the prime mover;
   a bed configured to carry a payload;
   a cab operatively connected to the bed;
   a cab yaw rate sensor on the cab configured to generate cab yaw rate signals indicative of a yaw rate of the cab;
   a lift angle sensor associated with the bed, the lift angle sensor configured to generate lift angle signals indicative of a lift angle of the bed;
   a payload sensor configured to generate payload signals indicative of the payload of the bed;
   a yaw rate sensor configured to generate yaw rate signals indicative of a yaw rate of the bed;
   a pitch rate sensor configured to generate pitch rate signals indicative of a pitch rate of the bed;
   a roll angle sensor configured to generate roll angle signals indicative of a roll angle of the bed;
   a ground speed sensor configured to generate ground speed signals indicative of a current speed of the machine; and
   a controller programmed and operating to:
      access machine characteristics of the machine;
      determine when a lift angle of the bed is changing based upon the lift angle signals;
      determine the yaw rate of the cab based upon the cab yaw rate signals;
      determine the payload of the bed based upon the payload signals;
      determine the yaw rate of the bed based upon the yaw rate signals;
      determine the pitch rate of the bed based upon the pitch rate signals;
      determine the roll angle of the bed based upon the roll angle signals;
      determine a desired speed of the bed based upon the machine characteristics, the payload of the bed, the yaw rate of the bed, the pitch rate of the bed, and the roll angle of the bed, wherein determining the desired speed is based upon the yaw rate of the cab without using the yaw rate of the bed while the lift angle of the bed is changing;
      determine a current speed of the machine based upon the ground speed signals; and
      when the current speed of the machine exceeds the desired speed, generate prime mover control signals to control operation of the prime mover to slow the machine so the current speed does not exceed the desired speed.

2. The dynamic roll over control system of claim 1, wherein the prime mover control signals control a rotational speed of the prime mover.

3. The dynamic roll over control system of claim 2, wherein the prime mover control signals control an amount of fuel provided to the prime mover.

4. The dynamic roll over control system of claim 3, further comprising a fuel usage sensor configured to generate fuel usage signals indicative of an amount of fuel provided to the prime mover.

5. The dynamic roll over control system of claim 1, wherein the prime mover comprises an engine, and the prime mover control signals control an amount of fuel provided to the engine.

6. The dynamic roll over control system of claim 1, further comprising a cab operatively connected to the bed, the prime mover being disposed.

7. The dynamic roll over control system of claim 1, wherein the controller is further configured to determine a power loss due to at least one power loss feed forward factor and generate the prime mover control signals based upon the power loss due to the at least one power loss feed forward factor.

8. The dynamic roll over control system of claim 7, further comprising a prime mover speed sensor configured to generate prime mover speed signals indicative of a speed of the prime mover, and the controller is further configured to determine the speed of the prime mover based upon the prime mover speed signals and determine the power loss based upon the speed of the prime mover.

9. The dynamic roll over control system of claim 7, further comprising a transmission operatively connected to the prime mover and the ground engaging drive mechanism, and a transmission speed sensor configured to generate transmission speed signals indicative of a speed of the transmission, and the controller is further configured to determine the speed of the transmission based upon the transmission speed signals and determine the power loss based upon the speed of the transmission.

10. The dynamic roll over control system of claim 7, further comprising a pitch angle sensor configured to generate pitch angle signals indicative of a pitch angle of the bed, and the controller is further configured to determine the pitch angle of the bed based upon the pitch angle signals and determine the power loss based upon the pitch angle of the bed.

11. The dynamic roll over control system of claim 7, further comprising a rolling resistance estimator configured to determine an estimate of a rolling resistance of the machine, and the controller is further configured to determine the power loss based upon the rolling resistance of the machine.

12. The dynamic roll over control system of claim 7, wherein the controller is further configured to determine the power loss based upon scrubbing losses of the machine, the scrubbing losses being based upon the yaw rate of the bed.

13. The dynamic roll over control system of claim 7, further comprising service brakes, and the controller is configured to generate a braking command to apply the service brakes to further slow the machine.

14. The dynamic roll over control system of claim 1, further comprising a cab operatively connected to the bed and a cab yaw rate sensor on the cab, the cab yaw rate sensor being configured to generate cab yaw rate signals indicative of a yaw rate of the cab, and the controller is further configured to determine the yaw rate of the cab based upon the cab yaw rate signals, and determine the desired speed based upon an average of the yaw rate of the bed and the yaw rate of the cab.

15. A method of controlling stability of a machine, the machine including a prime mover, a ground engaging drive mechanism operatively connected to the prime mover, a bed configured to carry a payload, and a cab connected to the bed, the method comprising:
   accessing machine characteristics of the machine;
   determining a yaw rate change of the cab based upon cab yaw rate signals from a cab yaw rate sensor;

determining a lift angle of the bed based upon lift angle signals from a lift angle sensor associated with the bed;

determining a payload of the bed based upon payload signals from a payload sensor;

determining a yaw rate of the bed based upon yaw rate signals from a bed yaw rate sensor;

determining a pitch rate of the bed based upon pitch rate signals from a pitch rate sensor;

determining a roll angle of the bed based upon roll angle signals from a roll angle sensor;

determining a desired speed of the bed based upon the machine characteristics, the payload of the bed, the yaw rate of the bed, the pitch rate of the bed, and the roll angle of the bed, wherein determining the desired speed is based upon the yaw rate of the cab without using the yaw rate of the bed when the lift angle signals indicate that the lift angle of the bed is changing;

determining a current speed of the machine based upon ground speed signals from a ground speed sensor; and when the current speed of the machine exceeds the desired speed, generating prime mover control signals to control operation of a prime mover of the machine to slow the machine so the current speed does not exceed the desired speed.

16. The method of claim 15, wherein generating prime mover control signals includes controlling a rotational speed of the prime mover.

17. The method of claim 16, further comprising controlling an amount of fuel provided to the prime mover.

18. The method of claim 15, further including determining a power loss due to at least one power loss feed forward factor and generating the prime mover control signals based upon the power loss due to the at least one power loss feed forward factor.

19. A machine comprising:
a front frame portion including a front ground engaging drive mechanism;
a rear frame portion including a rear ground engaging drive mechanism, the rear frame portion being operatively connected to the front frame portion such that the front and rear frame portions can pitch, yaw and roll relative to one another;
a prime mover operatively connected to at least one of the front ground engaging drive mechanism and the rear ground engaging drive mechanism;
a bed operatively connected to the rear frame portion and configured to carry a payload;
a cab disposed on the front frame portion;
a cab yaw rate sensor configured to generate cab yaw rate signals indicative of a yaw rate of the cab and the front frame portion;
a lift angle sensor associated with the bed, the lift angle sensor configured to generate lift angle signals indicative of a lift angle of the bed;
a payload sensor configured to generate payload signals indicative of the payload of the bed;
a yaw rate sensor configured to generate yaw rate signals indicative of a yaw rate of the bed;
a pitch rate sensor configured to generate pitch rate signals indicative of a pitch rate of the bed;
a roll angle sensor configured to generate roll angle signals indicative of a roll angle of the bed;
a ground speed sensor configured to generate ground speed signals indicative of a current speed of the machine; and
a controller programmed and operating to:
access machine characteristics of the machine;
determine when a lift angle of the bed is changing based upon the lift angle signals;
determine the yaw rate of the cab based on the cab yaw rate signals;
determine the payload of the bed based upon the payload signals;
determine the yaw rate of the bed based upon the yaw rate signals;
determine the pitch rate of the bed based upon the pitch rate signals;
determine the roll angle of the bed based upon the roll angle signals;
determine a desired speed of the bed based upon the machine characteristics, the payload of the bed, the yaw rate of the bed, the pitch rate of the bed, and the roll angle of the bed, wherein determining the desired speed is based upon the yaw rate of the cab without using the yaw rate of the bed while the lift angle of the bed is changing;
determine a current speed of the machine based upon the ground speed signals; and
when the current speed of the machine exceeds the desired speed, generate prime mover control signals to control operation of the prime mover to slow the machine so the current speed does not exceed the desired speed.

\* \* \* \* \*